United States Patent [19]
Nath

[11] Patent Number: 5,737,473
[45] Date of Patent: Apr. 7, 1998

[54] LIGHT GUIDE HAVING A FLEXIBLE PLASTIC TUBE FILLED WITH AN AQUEOUS SALT SOLUTION

[76] Inventor: Günther Nath, Ot o-Heilmann-Str. 3, D-82031 Grünwald, Germany

[21] Appl. No.: 649,269

[22] Filed: May 17, 1996

[30] Foreign Application Priority Data

May 17, 1995 [DE] Germany .......................... 195 18 147.6

[51] Int. Cl.[6] ................................ G02B 6/02; G02B 6/20
[52] U.S. Cl. ............................................................ 385/125
[58] Field of Search ...................... 362/32, 263; 385/117, 385/125, 141

[56] References Cited

U.S. PATENT DOCUMENTS

| 3,995,934 | 12/1976 | Nath | 385/125 |
|---|---|---|---|
| 4,009,382 | 2/1977 | Nath | 385/141 X |
| 4,747,662 | 5/1988 | Fitz | 362/32 |
| 4,907,133 | 3/1990 | Nath | 362/32 |

FOREIGN PATENT DOCUMENTS

| 1 502 445 | 3/1978 | United Kingdom . | |
| 1502445 | 3/1978 | United Kingdom | 385/125 |
| 2 248 312 | 4/1992 | United Kingdom . | |
| 95/12138 | 5/1995 | WIPO . | |

Primary Examiner—Akm E. Ullah
Attorney, Agent, or Firm—Helfgott & Karas, P.C.

[57] ABSTRACT

A light guide stable to UV-B radiation having an envelope made of a flexible fluorocarbon polymer tube and a liquid light conducting core which contains an aqueous chloride salt solution, such as a calcium chloride solution, which has a pH value adjusted by added alkali, e.g. KOH, to 6 or higher.

15 Claims, 1 Drawing Sheet

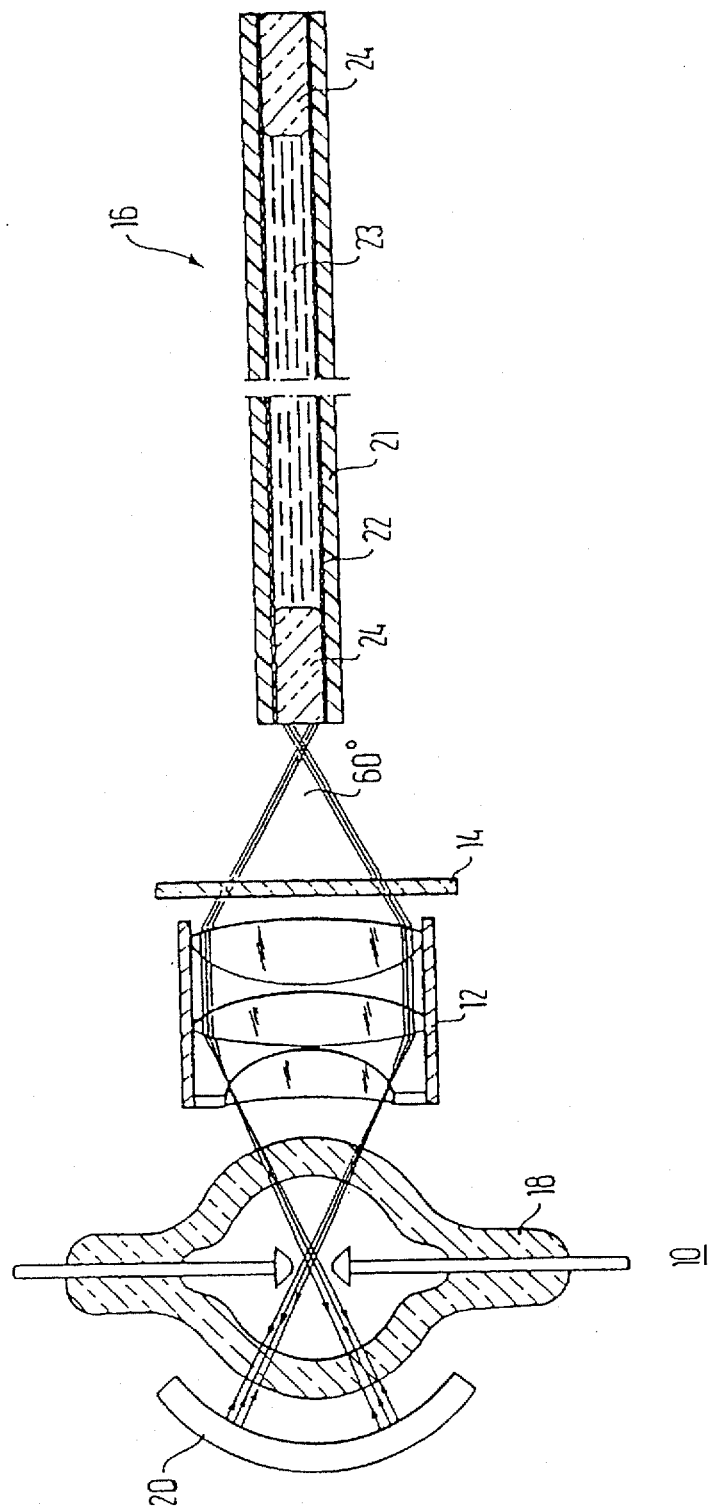

LIGHT GUIDE HAVING A FLEXIBLE PLASTIC TUBE FILLED WITH AN AQUEOUS SALT SOLUTION

FIELD OF THE INVENTION

The present invention relates to a light guide which contains a flexible tube-like envelope made of a fluorocarbon polymer, such as TEFLON FEP or PFA®, which is filled with a light conducting salt solution containing chloride and is sealed at its ends by transparent, stopper-like windows.

BACKGROUND OF THE INVENTION

In the case of a liquid core light guide of this type disclosed by U.S. Pat. No. 4,009,382, the liquid core consists of an aqueous calcium chloride solution having such a concentration that an index of refraction n of about 1.435 results. Higher refractive indices would in fact be desirable but are generally not feasible in practice since there is the risk at higher salt concentrations that the salt precipitates at low temperatures, as a result of which the light guide becomes unusable. These light guides have proved very successful in practice and are used extensively in association with gas discharge lamps, especially extra-high pressure mercury vapour lamps, for the photopolymerisation of plastics, since the salt solution has high transmission in the ultraviolet region of the spectrum also. They are also sufficiently stable, when the transmitted radiation is restricted to wavelength in the UV-A-range and longer, e.g. by means of an optical filter placed in front of them. If, however radiation of shorter wavelength, such as UV-B-radiation (about 280 to 330 nm) is applied to light guides of this type, the transmission in the whole UV range decreases rapidly. UV-B-radiation, e.g. Hg lines at 330 nm and 313 nm, is however, very effective for the photopolymerisation of the surface of adhesive coatings.

SUMMARY OF THE INVENTION

An object of the present invention is accordingly to improve the UV stability of a liquid core light guide of the type specified above.

According to the present invention, the pH value of the aqueous chloride salt solution is adjusted to near neutral to basic especially to 6 and above that. A pH range of 7 to 9, if necessary up to 10, is preferred. pH values over about 11 or 12 are generally not desirable since more strong basic solutions have the tendency gradually to attack the glass or quartz-glass stoppers sealing the flexible plastic tube. The known $CaCl_2$ solution having a refractive index of approximately 1.435 has a pH of approximately 4. According to the invention, this solution, the pH of which lies in the acid range, is at least nearly neutralized, preferably rendered basic, by the addition of alkali. In the case of the forementioned calcium chloride solution, addition of KOH or NaOH has proved satisfactorily.

BRIEF DESCRIPTION OF THE DRAWING

The sole figure of the drawing shows in a very simplified fashion an illuminating apparatus in which the invention can be advantageously embodied.

DESCRIPTION OF THE PREFERRED EMBODIMENT

The illuminating apparatus shown in the drawing, contains a light source 10, a quartz condensor 12, an optical filter 14 (optional), and a light guide 16. In the case of the example shown, the light source 10 comprises a 200 W high-pressure mercury vapour lamp 18, type HBO 200, with a concave, spherical reflector 20. The light source may also contain a different vapour or gas discharge lamp and a tungsten-halogen projection lamp with a cold light reflector is preferred for some purposes. The light guide 16 comprises a flexible, tube-like envelope 21 and a liquid core 23 of the type explained above. The envelope consists of fluoropolymer material with a low refractive index (n=approx. 1.35), specifically TEFLON FEP, the terpolymer Hostaflon TFB® of Hoechst AG, or alternatively TEFLON PTFE or TEFLON PFA® or TEFZEL ETFE® of Dupont or PCTFE (polychlorotrifluoro-ethylene) or PVDF (3M). On its inner surface, the envelope has a layer 22 of TEFLON AF®, which is thin in comparison to the thickness of the wall of the envelope. The thickness of the layer 22 usually is a few micrometers. The envelope 21 is closed off by a cylindrical quartz window 24 at both of its ends. The liquid core 23 consists of an aqueous calcium chloride solution having a pH of about 7.0 to 8.5. The aqueous salt solution may also contain $D_2O$ instead of $H_2O$ or a mixture of both. Example of a preferred salt solution for the liquid core 23 To 2000 ml of calcium chloride solution having a concentration which yields a refractive index n=1.4355 , 1 ml of KOH solution made from 12 g of $KOH \cdot H_2O$ per 100 ml of $H_2O$ is added. The resulting solution has a pH of approximately 8.

Radiation in the wavelength range of 280 to 450 nm was applied to a light guide filled with this alkaline calcium chloride solution, and to a conventional light guide filled with the usual calcium chloride solution (pH=4), both having a length of 3000 mm and a core diameter of 5 mm, by means of a 200 W extra-high pressure mercury vapour lamp. The light output in this range amounted to 3 W. Initially, both light guides had a transmission of 74% at the important Hg line at 365 nm. After 100 hours the transmission of the conventional light guide had fallen to 56%, while that of the light guide according to the invention still amounted as before to 74%.

The above example can be modified in various ways, e.g. instead of KOH, another alkali metal hydroxide, especially NaOH or any other suitable alkaline substance, e. g. an alkaline earth hydroxide, such as $Ca(OH)_2$, can be used. Instead of $CaCl_2$ or in addition to the latter, the solution can also contain other chlorides or bromides e.g. KCl or $MgCl_2$, $ZnCl_2$ or $CaBr_2$.

I claim:

1. A light guide comprising an envelope made of a flexible plastic tube and a light conducting core containing an aqueous halogenide salt solution, characterized in that the solution further comprises an alkaline substance in such an amount that the solution has a pH value of at least 6.

2. A light guide as claimed in claim 1, wherein the pH value of the salt solution is at most equal to 12.

3. A light guide as claimed in claim 1, wherein the pH value of the salt solution is in the range of 6 to 10.

4. A light guide as claimed in claim 1, wherein the aqueous salt solution contains calcium chloride.

5. A light guide as claimed in claim 1, wherein the aqueous salt solution contains $D_2O$ instead of $H_2O$ or a mixture of $H_2O$ and $D_2O$.

6. A light guide as claimed in claim 1, wherein the salt solution contains a hydroxide of an alkali metal.

7. A light guide as claimed in claim 1, wherein the salt solution contains a hydroxide of an alkali earth metal.

8. A light guide as claimed in claim 1, wherein the salt solution containes KOH.

9. A light guide as claimed in claim 1, wherein the salt solution contains NaOH.

10. A light guide as claimed in claim 1, wherein the salt solution has a refractive index of about 1.435.

11. A light guide as claimed in claim 1, wherein it is optically coupled to a light source comprising a discharge lamp.

12. A light guide comprising an envelope made of a flexible plastic tube and a light conducting core containing an aqueous calcium chloride solution, characterized in that the solution further comprises an alkaline substance in such an amount that the solution has a pH value in the range from 6 to 10.

13. A light guide as claimed in claim 12, wherein the pH value is in the range from 7 to 9.

14. A light guide as claimed in claim 12, wherein the alkaline substance comprises at least one of the substances selected from the group consisting of KOH, NaOH, ammonium hydroxide and earth alkali metal hydroxide.

15. A light guide as claimed in claim 12, wherein the alkaline substance includes at least one of the substances selecting from the group consisting of calcium hydroxide and magnesium hydroxide.

* * * * *